US010904436B2

(12) United States Patent
Heo et al.

(10) Patent No.: US 10,904,436 B2
(45) Date of Patent: Jan. 26, 2021

(54) IMAGE SENSOR AND ELECTRONIC DEVICE INCLUDING THE IMAGE SENSOR

(71) Applicant: Samsung Electronics Co., Ltd., Suwon-si (KR)

(72) Inventors: Jae Sung Heo, Hwaseong-si (KR); Kyung Ho Kim, Hwaseong-si (KR); Won Seok Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/124,348

(22) Filed: Sep. 7, 2018

(65) Prior Publication Data

US 2019/0238751 A1    Aug. 1, 2019

(30) Foreign Application Priority Data

Jan. 31, 2018 (KR) ........................ 10-2018-0011881

(51) Int. Cl.
*H04N 5/232*  (2006.01)
*H04N 5/367*  (2011.01)

(52) U.S. Cl.
CPC ..... *H04N 5/23245* (2013.01); *H04N 5/23232* (2013.01); *H04N 5/3675* (2013.01); *H04N 5/23241* (2013.01)

(58) Field of Classification Search
CPC ......... H01L 27/14634; H01L 27/14638; H01L 27/1465; H01L 27/14661; H01L 27/1467; H04N 5/23232; H04N 5/23241; H04N 5/23245; H04N 5/3675
See application file for complete search history.

(56) References Cited

U.S. PATENT DOCUMENTS

| 5,764,286 | A | 6/1998 | Kawamura et al. |
| 6,650,366 | B2 | 11/2003 | Perulski et al. |
| 6,859,226 | B2 | 2/2005 | Kawamura et al. |
| 7,301,563 | B1 | 11/2007 | Kakinuma et al. |
| 7,456,875 | B2 * | 11/2008 | Kashiwa .......... G08B 13/19621 348/207.99 |
| 7,755,664 | B2 | 7/2010 | Kakinuma et al. |
| 8,548,235 | B2 | 10/2013 | Suzuki |
| 8,629,919 | B2 * | 1/2014 | Imai ...................... H04N 9/735 348/223.1 |
| 8,830,367 | B1 | 9/2014 | Mobbs et al. |
| 9,313,378 | B2 | 4/2016 | Lee et al. |

(Continued)

*Primary Examiner* — Chiawei Chen
(74) *Attorney, Agent, or Firm* — Muir Patent Law, PLLC

(57) ABSTRACT

An electronic device includes an image sensor including an image generator configured to generate and output a pixel image, an image processing device configured to process the pixel image, and a storage unit configured to store the pixel image, and an application processor configured to generate a mode setting signal and configured to transmit the generated mode setting signal to the image processing device. The image processing device is configured to generate a plurality of path selection signals for selecting a path to use by the image processing device to process the pixel image, based on the mode setting signal. The image processing device selects a compression ratio for the pixel image based on at least one of an input signal of a user, an analysis result of the pixel image, and a motion signal of the image sensor, and compresses the pixel image based on the selected compression ratio.

19 Claims, 10 Drawing Sheets

(56) References Cited

U.S. PATENT DOCUMENTS

| | | |
|---|---|---|
| 9,392,194 B2 | 7/2016 | Mobbs et al. |
| 9,491,495 B2 | 11/2016 | Bohm et al. |
| 9,516,221 B2 | 12/2016 | Lee |
| 9,535,489 B2 | 1/2017 | Ju et al. |
| 10,199,417 B2* | 2/2019 | Shimokura ............ H04N 5/369 |
| 2002/0051643 A1* | 5/2002 | Nakashita ............ H04N 5/2352 396/429 |
| 2003/0025796 A1* | 2/2003 | Yamagishi ......... H04N 1/00188 348/207.2 |
| 2004/0135903 A1 | 7/2004 | Brooks et al. |
| 2006/0171697 A1* | 8/2006 | Nojima ................. G03B 17/04 396/103 |
| 2007/0159538 A1 | 7/2007 | Kakinuma et al. |
| 2007/0229698 A1 | 10/2007 | Kakinuma et al. |
| 2009/0041436 A1* | 2/2009 | Kamimura .............. H04N 5/77 386/236 |
| 2010/0079589 A1* | 4/2010 | Yoshida ............ H04N 5/23245 348/81 |
| 2010/0259672 A1* | 10/2010 | Koehler ................. G03B 17/02 348/374 |
| 2011/0102614 A1 | 5/2011 | Juen |
| 2012/0267511 A1* | 10/2012 | Kozlowski ............ H04N 5/378 250/208.1 |
| 2013/0258136 A1 | 10/2013 | Lee |
| 2014/0016693 A1* | 1/2014 | Zhang ................ H04N 21/2343 375/240.02 |
| 2014/0355948 A1* | 12/2014 | Kosakai ............ H04N 5/23232 386/224 |
| 2015/0015760 A1* | 1/2015 | Tsunai .............. H01L 27/14636 348/311 |
| 2015/0029355 A1* | 1/2015 | Kim ................... H04N 5/23229 348/222.1 |
| 2015/0077590 A1* | 3/2015 | Kuriyama ............ H04N 5/2353 348/231.99 |
| 2015/0097258 A1* | 4/2015 | Shigetoshi ........ H01L 27/14634 257/432 |
| 2016/0190196 A1* | 6/2016 | Cheng .................... H01L 24/80 257/459 |
| 2016/0198115 A1* | 7/2016 | Tsuchiya ............ H04N 5/35554 348/294 |
| 2016/0267623 A1 | 9/2016 | Heo |
| 2016/0301846 A1 | 10/2016 | Mobbs et al. |
| 2016/0344953 A1 | 11/2016 | Jeong et al. |
| 2016/0373680 A1* | 12/2016 | Shimokura ....... H01L 27/14634 |
| 2017/0070696 A1 | 3/2017 | Shiraishi |
| 2017/0078567 A1 | 3/2017 | Ju et al. |
| 2017/0111563 A1* | 4/2017 | Gohara ............ H01L 27/14621 |
| 2017/0171443 A1 | 6/2017 | Mobbs et al. |
| 2018/0288316 A1* | 10/2018 | Shionoya ........... H04N 9/04515 |
| 2019/0131336 A1* | 5/2019 | Yoon ................ H01L 27/14685 |
| 2019/0228497 A1* | 7/2019 | Muramatsu ............ H04N 5/379 |

* cited by examiner

IMAGE SENSOR AND ELECTRONIC DEVICE INCLUDING THE IMAGE SENSOR

CROSS-REFERENCE TO THE RELATED APPLICATION

This U.S. non-provisional patent application claims priority under 35 U.S.C. § 119 to Korean Patent Application No. 10-2018-0011881, filed on Jan. 31, 2018, in the Korean Intellectual Property Office (KIPO), the disclosure of which is incorporated herein by reference in its entirety.

BACKGROUND

1. Field

Apparatuses consistent with example embodiments relate to a stack type image sensor and an electronic device including the stack type image sensor.

2. Description of Related Art

An image sensor capable of high speed transmission may have a stack structure including a frame buffer of large capacity. The image sensor inputs a pixel image generated from a pixel array to a frame buffer at a high speed, and stores the input pixel image in the frame buffer. The pixel image is output from the frame buffer at a low speed. Thus, the image sensor may operate in a super slow mode in which the image is slowly displayed.

Such an image sensor stores more pixel images in the frame buffer. Therefore, a new technology configured to compress the image to store more images in the frame buffer and to decrease image loss during the compression would be desirable.

SUMMARY

Aspects of the present disclosure are directed to providing an image sensor which allows image loss to be decreased, storage efficiency of a pixel image according to requirements of a user to be increased, and transmission efficiency of an image output terminal to be increased.

An image sensor includes a first chip including an image generator configured to generate and output a pixel image, a second chip including an image processing device configured to determine one mode among a plurality of modes based on an externally applied mode setting signal, generate a plurality of path selection signals based on the determined mode, and process the pixel image in response to the path selection signals, and a third chip including a storage unit in which the pixel image output from the image processing device is stored. The second chip is stacked on the third chip and the first chip is stacked on the second chip so that the second chip is between the first chip and the third chip, or the third chip is stacked on the second chip and the first chip is stacked on the third chip so that the third chip is between the first chip and the second chip.

An electronic device includes an image sensor including an image generator configured to generate and output a pixel image, an image processing device configured to process the pixel image, and a storage unit configured to store the pixel image, and an application processor configured to generate a mode setting signal and configured to transmit the generated mode setting signal to the image processing device. The image processing device is configured to generate a plurality of path selection signals for selecting a path to use by the image processing device to process the pixel image, based on the mode setting signal. The image processing device selects a compression ratio for the pixel image based on at least one of an input signal of a user, an analysis result of the pixel image, and a motion signal of the image sensor, and compresses the pixel image based on the selected compression ratio.

A method of controlling an image processing device includes generating a pixel image, determining one mode among a plurality of modes based on a frame rate of the pixel image and generating a plurality of path selection signals in response to the determined mode, when the frame rate of the pixel image is within a first predetermined range: determining a first mode, generating a first set of path selection signals based on the first mode, and performing a first process on the pixel image in response to the first set of path selection signals, and performing a second process on the pixel image processed by the first process, and when the frame rate of the pixel image is within a second predetermined range: determining a second mode, generating a second set of path selection signals based on the second mode, and performing the first process on the pixel image in response to the second set of path selection signals, compressing the pixel image processed by the first process, storing the compressed pixel image in a storage unit, decompressing the compressed pixel image output from the storage unit, and performing the second process on the decompressed pixel image.

DETAILED DESCRIPTION

Figure 1:
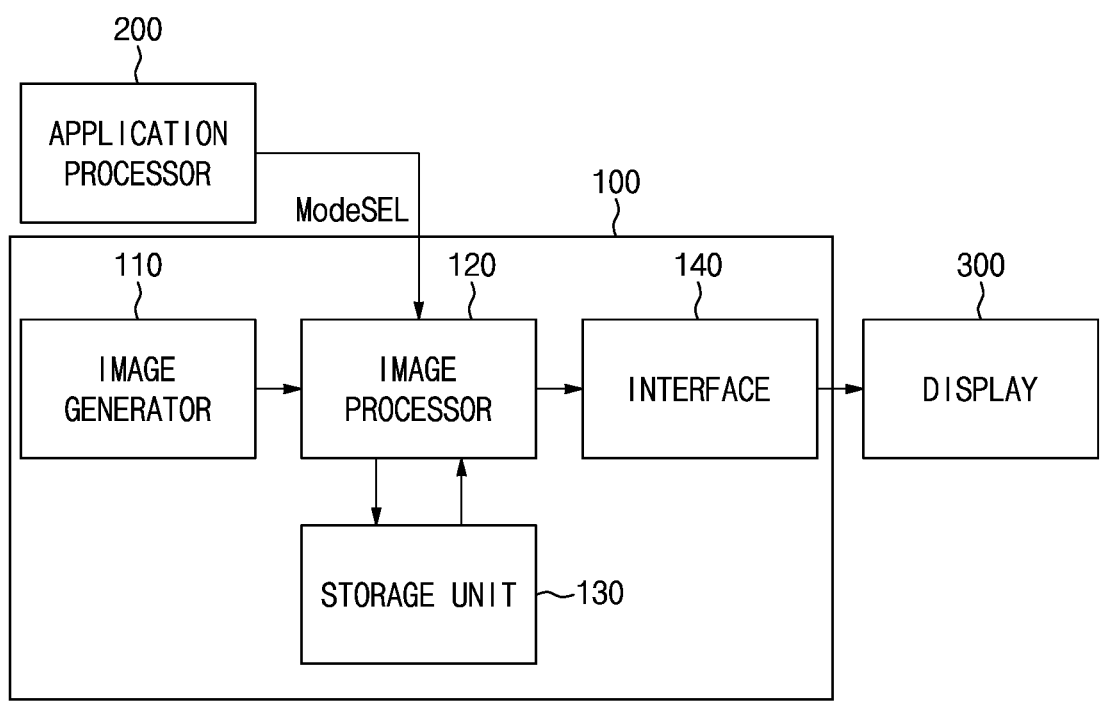
FIG. 1 is a block diagram illustrating a structure of an electronic device according to an example embodiment.

FIG. 1 is a block diagram illustrating a structure of an electronic device according to an example embodiment.

Referring to FIG. 1, an electronic device 10 according to the example embodiment may include an image sensor 100, an application processor 200, and a display 300.

The electronic device 10 may be, for example, a mobile phone, or tablet computer, laptop computer, or other personal electronics device.

The image sensor 100 may generate image data corresponding to a subject received through an optical lens.

The image sensor 100 may include an image generator 110, an image processing device 120, a storage unit 130, and an interface 140.

The image generator 110 may include an active pixel sensor (APS). The APS may include a plurality of pixels configured to generate pixel signals corresponding to a plurality of row lines. The pixels may store photo charges in response to incident light, and may generate pixel signals corresponding to the stored photo charges.

The image generator 110 may include an analog-to-digital convertor configured to process the pixel signal to generate a pixel image PI and output the generated pixel image to the image processing device 120. In one embodiment, the pixel image PI may represent all of the pixels forming a unit image, where a unit image may refer to an still image, also described as an image frame, or a consecutive set of image frames, such as a video, also described as a video image. For example, the pixel image may be in the format of a Bayer pattern, a black and white pattern, etc. Also, the pixel image PI may include a phase detection pixel of 2PD (2 phase detector) or multi-PD (multi-phase detector) to realize a phase detection. Also, a pixel value in one example embodiment may represent analog or digital data corresponding to each of the pixels among all of the pixels forming the pixel image.

The image processing device 120 may image-process the pixel image PI input from the image generator 110. For example, the image processing device 120 may image-process to improve display quality of the pixel image PI, to control resolution, etc. The image processing device 120 may input the image-processed pixel image to the storage unit 130, or may output the image-processed pixel image from the storage unit 130, or may output the image-processed pixel image to the interface 140.

The image processing device 120 may operate in one mode among a plurality of modes. For example, the image processing device 120 may include a moving image capturing mode, a panoramic mode, a super-slow mode, a high-speed output mode (FRS), etc., but is not limited by the above.

The mode of the image processing device 120 may be determined based on a mode set signal ModeSEL applied from the outside. For example, the mode set signal ModeSEL may be provided from an application processor 200 externally connected to the image sensor. Alternatively, the mode of the image processing device 120 may be determined based on a frame rate of an input pixel image, as discussed further below.

The storage unit 130 may temporarily store the pixel image input from the image processing device 120. For example, the storage unit 130 may store the plurality of pixel images in frame units or units based on dividing a frame according to a predetermined ratio. The storage unit 130 may include a volatile memory such as a dynamic random access memory (DRAM), a static random access memory (SRAM), etc. Alternatively, the storage unit 130 may include a non-volatile memory such as a flash memory, a magnetic RAM (MRAM), etc. The storage unit 130 may be a frame buffer.

The interface 140 may transmit the pixel image-processed by the image processing device 120 to a display device disposed outside the image sensor 100. The interface 140 may include an interface supporting a mobile industry processor interface (MIPI), but is not limited by the above.

Figure 2:
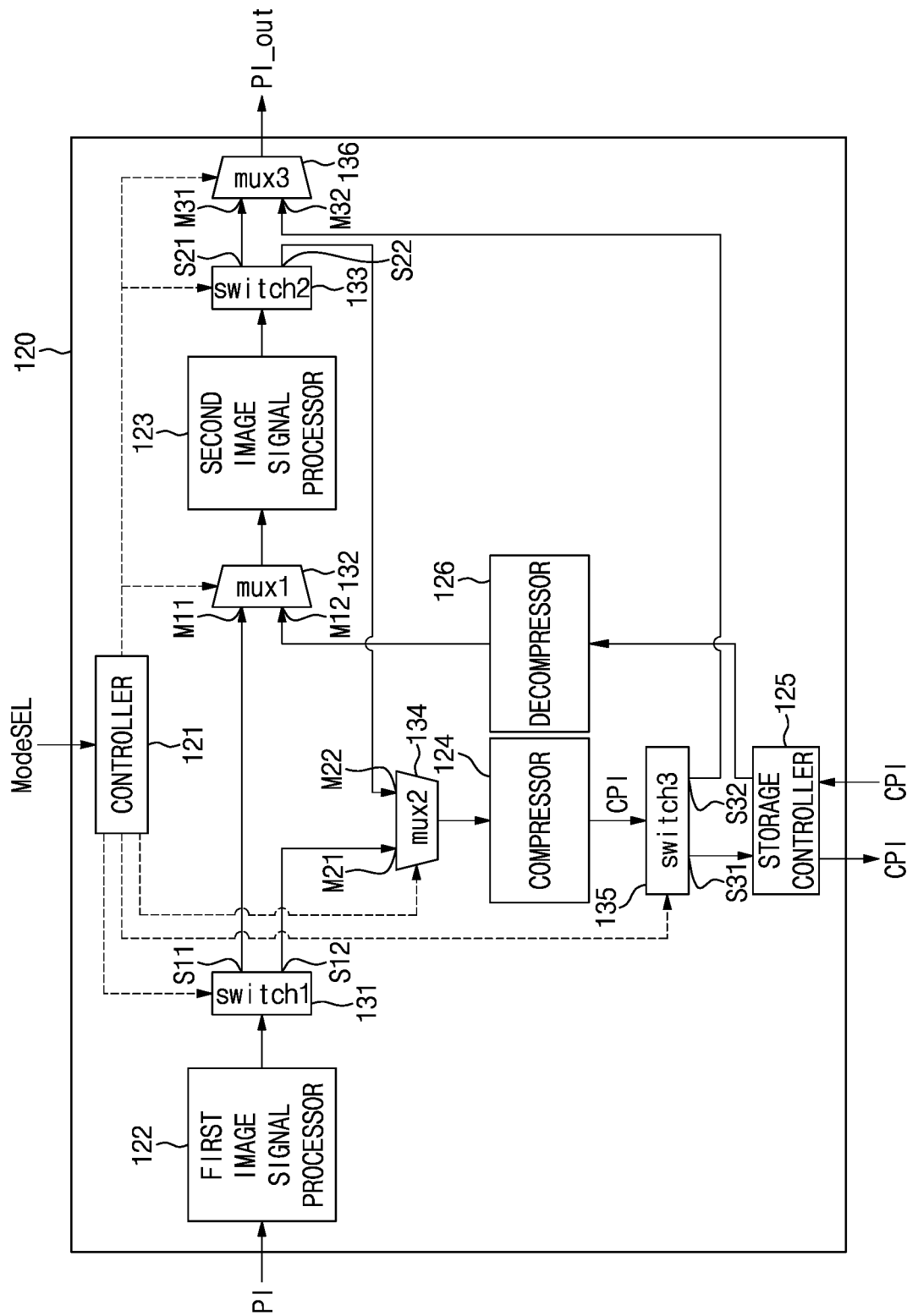
FIG. 2 is a block diagram illustrating an example structure of an image processing device shown in FIG. 1.

FIG. 2 is a block diagram illustrating an example structure of the image processing device 120 shown in FIG. 1.

Referring to FIGS. 1 and 2, the image processing device 120 according to an example embodiment may be an image processor and may include a controller 121, a first image signal processor 122, a second image signal processor 123, a compressor 124, a storage controller 125, a decompressor 126, a plurality of switches, and a plurality of multiplexers. The switches include a first switch 131, a second switch 133, and a third switch 135. The multiplexers include a first multiplexer 132, a second multiplexer 134, and a third multiplexer 136. It should be noted that unless the context indicates otherwise, terms such as "first," "second," "third," etc., used herein are merely used as a naming convention, for example to differentiate different items from each other. These terms may be used in the claims even if they are not used to describe particular elements in the specification, as a simple naming convention.

Also, as is traditional in the field of the disclosed technology, features and embodiments are described, and illustrated in the drawings, in terms of functional blocks, units and/or modules. Those skilled in the art will appreciate that these blocks, units and/or modules (e.g., controllers, signal processors, multiplexers, switches, etc., shown in FIG. 2, and other items shown in the other figures) are physically implemented by electronic (or optical) circuits such as logic circuits, discrete components, microprocessors, hard-wired circuits, memory elements, wiring connections, and the like, which may be formed using semiconductor-based fabrication techniques (e.g., for fabricating integrated circuits) or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The controller 121 may generate one or more path selection signals based on a mode of the image processing device 120. For example, the controller 121 may generate a plurality of the path selection signals to different image processing device components based on the mode set signal ModeSEL applied from the outside. The controller 121 may output the generated path selection signals to the switches and the multiplexers, and may control the image processing path of the image processing device 120. The values of a plurality of path selection signals sent to a plurality of corresponding respective image processing device components may control the path selected. For example, certain of the path selection signals may have a high value and certain of the path selection signals may have a low value, as discussed further below, and a given set of path selection signals may be sent to the different image processing device components based on the selected mode.

Also, the controller 121 may control the first image signal processor 122 and the second image signal processor 123. For example, the controller 121 may control activation of at least one portion of a first processing function of the first image signal processor 122 and a second processing function of the second image signal processor 123.

The first image signal processor 122 may perform a first process on the pixel image input from the image generator 110. For example, the first process may include one or more of image scaling, noise reduction, dynamic range compensation, anti-shading, etc. Also, the first process is not limited thereto, but may perform all the functions related to image processing included in a conventional image signal processor. The first image signal processor 122 may output through the first switch 131 the pixel image processed by the first process.

The first switch 131 may output through one of an $11^{th}$ output terminal S11 or a $12^{th}$ output terminal S12 the pixel image processed by the first process, in response to and based on the path selection signal. For example, when the path selection signal is at a first level, the first switch 131 may output a signal through the $11^{th}$ output terminal S11 the pixel image processed by the first process. When the path selection signal is at a second level, the first switch 131 may output a signal through the $12^{th}$ output terminal the pixel image processed by the first process. The $11^{th}$ output terminal S11 may be connected to the first multiplexer 132, and the $12^{th}$ output terminal S12 may be connected to the second multiplexer 134.

These output terminals may refer to a specifically ordered terminal within a group of terminals that output signals from the first switch 131. For example, if there are at least 12 output terminals of the first switch 131 ordered physically in one or more rows, the 11th output terminal S11 may be the 11th output terminal from one end of the terminals, and the 12th output terminal S12 may be the 12th output terminal from the same one end of the terminals. For naming purposes, the 11th output terminal S11 and the 12th output terminal S12, and other output and input terminals described herein as 11th, 12th, 21st, 22nd, 31st, or 32nd, may also be described herein as first and second output terminals, respectively (or by using other names such as third or fourth), which do not refer to any particular positioning or order of the terminals. If an order of the terminals is intended in the claims, such terminals will be referred to herein as "ordered terminals." For example, an 11th ordered terminal or a 12th ordered terminal. The input and output terminals described herein may be pins, pads, leads, wires, or other conductive elements that initiate or terminate the communication of a signal from or to a particular component.

The first multiplexer 132 may respond to the path selection signal, and may output the pixel image received through one of an $11^{th}$ input terminal M11 or a $12^{th}$ input terminal M12 to the second image signal processor 123. The $11^{th}$ input terminal M11 is connected to the $11^{th}$ output terminal S11 of the first switch, and the $12^{th}$ input terminal M12 may be connected to the decompressor 126. The 11th input terminal M11 and the 12th input terminal M12 may refer to a specifically ordered terminal within a group of terminals that input signals to the first multiplexer 132. For example, if there are at least 12 output terminals of the first multiplexer 132 ordered physically in one or more rows, the 11th input terminal M11 may be the 11th input terminal from one end of the terminals, and the 12th input terminal M12 may be the 12th input terminal from the same one end of the terminals. In one embodiment, when the path selection signal is at the first level, the first multiplexer 132 may receive through the $11^{th}$ input terminal M11 the pixel image processed by the first process. When the path selection signal is at the second level, the first multiplexer 132 may receive the decompressed pixel image through the $12^{th}$ input terminal M12. For example, when the path selection signal is at the first level, the first multiplexer 132 may select for output the pixel image processed by the first process and received at the $11^{th}$ input terminal M11. When the path selection signal is at the second level, the first multiplexer 132 may select for output the decompressed pixel image received at the $12^{th}$ input terminal M12.

The second image signal processor 123 may perform a second process on the pixel image output from the first multiplexer 132, and may output the pixel image processed by the second process to the second switch 133. For example, the second process may perform a function of which a portion is the same as at least one portion of the above-described first process, but may not be limited by the above. The second process may include a different function from the first process.

The second switch 133 may output through one of a $21^{st}$ output terminal S21 or a $22^{nd}$ output terminal S22 the pixel image processed by the second process, in response to and based on the path selection signal. These output terminals may refer to a specifically ordered terminal within a group of terminals that output signals from the second switch 133. For example, if there are at least 22 output terminals of the second switch 133 ordered physically in one or more rows, the 21st output terminal S21 may be the 21st output terminal from one end of the terminals, and the 22nd output terminal S22 may be the 22nd output terminal from the same one end of the terminals. The $21^{st}$ output terminal S21 may be connected to a third multiplexer 136, and the $22^{nd}$ output terminal S22 may be connected to the second multiplexer 134. For example, when the path selection signal is at the first level, the second switch 133 may output the pixel image processed by the second process to the third multiplexer 136 through the $21^{st}$ output terminal S21. When the path selection signal is at the second level, the second switch 133 may output through the $22^{nd}$ output terminal the pixel image processed by the second process, e.g., to the second multiplexer 134.

The second multiplexer 134 may respond to the path selection signal, and may output the pixel image received through one of a $21^{st}$ input terminal M21 or a $22^{nd}$ input terminal M22 to the compressor 124. These input terminals may refer to a specifically ordered terminal within a group of terminals that input signals to the second multiplexer 134. For example, if there are at least 22 input terminals of the second multiplexer 134 ordered physically in one or more rows, the 21st input terminal M21 may be the 21st input terminal from one end of the terminals, and the 22nd input terminal M22 may be the 22nd input terminal from the same one end of the terminals. The $21^{st}$ input terminal M21 of the second multiplexer 134 is connected to the $12^{th}$ output terminal S12 of the first switch, and the $22^{nd}$ input terminal M22 may be connected to the $22^{nd}$ output terminal S22 of the second switch 133. For example, when the path selection signal is at the first level, the second multiplexer 134 may output to the compressor 124 the pixel image processed by the first process received through the $21^{st}$ input terminal M21. When the path selection signal is at the second level, the second multiplexer 134 may output to the compressor 124 the pixel image processed by the second process and received through the $22^{nd}$ input terminal M22.

The compressor 124 may compress the pixel image output from the second multiplexer 134, and may output the compressed pixel image CPI to the third switch 135. As an example, the compressor 124 may select and use a compression algorithm based on characteristics of the pixel image or the input of the controller 121, as discussed further below.

The pixel image CPI compressed by the compressor 124 may have various image qualities based on the compression ratio. When the compression ratio is increased, resolution of the compressed pixel image CPI may be decreased. For example, the compression ratio of the pixel image PI compressed by the compressor 124 may be in a range of 20% to 80%, and the compressor 124 may select the compression ratio with respect to the resolution of the pixel image PI.

For example, the compressor 124 may select the compression ratio based on at least one among an analysis result of the pixel image PI, a motion signal of the image sensor, and an input signal of the user, and may compress the pixel image based on the selected compression ratio. For example, the analysis result of the pixel image PI may include an analysis result of a frequency scalar of the pixel image or a defective pixel detection result of the pixel image PI.

The third switch 135 may output the compressed pixel image CPI through any one among a $31^{st}$ output terminal S31 or a $32^{nd}$ output terminal S32, in response to the path selection signal. The $31^{st}$ output terminal S31 may be connected to the storage controller 125, and the $32^{nd}$ output terminal S32 may be connected to the third multiplexer 136. For example, when the path selection signal is at the first level, the third switch 135 may output the compressed pixel image CPI to the storage controller 125 through the $31^{st}$ output terminal S31. When the path selection signal is at the second level, the third switch 135 may output the compressed pixel image CPI to the third multiplexer 136 through the $32^{nd}$ output terminal S32. The 31st output terminal S31 and 32nd output terminal S32 may refer to a specifically ordered terminal within a group of terminals that output signals from the third switch 135. For example, if there are at least 32 output terminals of the third switch 135 ordered physically in one or more rows, the 31st output terminal S31 may be the 31st output terminal from one end of the terminals, and the 32nd output terminal S32 may be the 32nd output terminal from the same one end of the terminals.

The storage controller 125 may input to the storage unit 130 the compressed pixel image CPI output from the third switch 135, or may receive the compressed pixel image CPI output from the storage unit 130 to output to the decompressor 126. The storage controller 125 may transmit the type of the compression algorithm preset by the compressor 124 to the decompressor 126. The storage controller 125 may control an input speed into the storage unit 130 and an output speed from the storage unit 130. For example, the storage controller 125 may control the input speed into the storage unit 130 to be a high speed, and may control the output speed from the storage unit 130 to be a low speed. For example, when the image processing device 120 operates in a slow motion mode, a frame rate (the number of frames per second) of the pixel image output from the image processing device 120 to the interface 140 through the storage controller 125 may be in a range of $\frac{1}{10}$ to $\frac{1}{40}$ of a frame rate of the pixel image input from the image generator 110 to the image processing device 120.

In some embodiments, the data input into the storage unit 130 has the same total size as the data output from the storage unit 130. However, when an output time from the storage unit 130 is greater than an input time into the storage unit 130, an output bandwidth from the storage unit 130 may be smaller than an input bandwidth into the storage unit 130. When the storage controller 125 relatively decreases the output speed from the storage unit 130 so that a smaller amount of data is processed per unit of time between the decompressor 126 and the interface 140, efficiency in terms of gate count and power consumption may be improved.

The decompressor 126 may remove the compression of the compressed pixel image, and may output the decompressed pixel image to the first multiplexer 132. The compressor 124 and the decompressor 126 may include a compression circuit and a decompression circuit of an inversion function configured to decompress an original signal in a loss or lossy state. The compression ratio of the compressor 124 may use a fixed method or a non-fixed method.

The third multiplexer 136 may output to the interface 140 one of the pixel images, which is received through the $31^{st}$ input terminal M31 or the $32^{nd}$ input terminal M32 in response to the path selection signal. The $31^{st}$ input terminal M31 may be connected to the $21^{st}$ output terminal S21 of the second switch 133, and the $32^{nd}$ input terminal M32 may be connected to the $32^{nd}$ output terminal S32 of the third switch 135. For example, when the path selection signal is at the first level, the third multiplexer 136 may output the pixel image processed by the second process and received through the $31^{st}$ input terminal M31. When the path selection signal is at the second level, the third multiplexer 136 may output the compressed pixel image received through the $32^{nd}$ input terminal M32. The 31st input terminal M31 and 32nd input terminal M32 may refer to a specifically ordered terminal within a group of terminals that input signals to the third multiplexer 136. For example, if there are at least 32 input terminals of the third multiplexer 136 ordered physically in one or more rows, the 31st input terminal M31 may be the 31st input terminal from one end of the terminals, and the 32nd input terminal M32 may be the 32nd input terminal from the same one end of the terminals.

When the mode of the image processing device 120 is determined as a first mode, the controller 121 may select a first path selection signal. The first path selection signal may include a plurality of signals applied to the first switch 131, the first multiplexer 132, the second switch 133, and the third multiplexer 136 at the first level. The first image signal processor 122 may output the pixel image processed by the first process to the second image signal processor 123 through the first switch 131 and the first multiplexer 132. The second image signal processor 123 may perform the second process on the pixel image processed by the first process, and may output the pixel image processed by the second process to the interface 140 through the second switch 133 and the third multiplexer 136.

When the mode of the image processing device 120 is determined as a second mode, the controller 121 may select a second path selection signal. The second path selection signal may include a plurality of signals applied to the first switch 131 and the first multiplexer 132 at the second level, and a plurality of signals applied to the second switch 133, the third switch 135, the second multiplexer 134, and the third multiplexer 136 at the first level. The first image signal processor 122 may output the pixel image processed by the first process to the compressor 124 through the first switch 131 and the second multiplexer 134. The compressor 124 may compress the pixel image processed by the first process, and may output the compressed pixel image to the storage controller 125 through the third switch 135. The storage controller 125 may output the compressed pixel image to the storage unit 130, and may receive the compressed pixel image output from the storage unit 130 to output to the decompressor 126. The decompressor 126 may decompress the compressed pixel image and output to the second image signal processor 123 through the first multiplexer 132. The second image signal processor 123 may perform the second process on the decompressed pixel image, and may output the pixel image processed by the second process to the interface 140 through the second switch 133 and the third multiplexer 136.

According to the example embodiment, when the determined mode is the second mode and the slow motion mode for a video, the frame rate of the pixel image output from the image processing device 120 may be in a range of 1/10 to 1/40 of the frame rate of the pixel image output from the image generator 110 to the image processing device 120. In the slow motion mode, the motion of the captured subject is displayed in slower speed than a real motion. For example, the image processing device 120 may operate in the slow motion mode in response to the input signal of the user.

When the mode of the image processing device 120 is determined as a third mode, the controller 121 may select a third path selection signal. The third path selection signal may include a plurality of signals applied to the first switch 131 and the first multiplexer 132 at the first level, and a plurality of signals applied to the second switch 133, the second multiplexer 134, the third switch 135, and the third multiplexer 136 at the second level. The first image signal processor 122 may output the pixel image processed by the first process to the second image signal processor 123 through the first switch 131 and the first multiplexer 132. The second image signal processor 123 may perform the second process on the pixel image processed by the first process, and may output the pixel image processed by the second process to the compressor 124 through the second switch 133 and the second multiplexer 134. The compressor 124 may compress the pixel image processed by the second process, and may output the compressed pixel image to the interface 140 through the third switch 135 and the third multiplexer 136.

In one embodiment, the operation of the image processing device 120 in the first mode or the third mode may be to output the photographed image in real time. The image processing device 120 can operate in the first mode or the third mode before the start of capturing a moving image or a picture although the camera is activated. Also the image processing device 120 can operate in the first mode or the third mode even after the capturing the moving image or the picture is started. For example, the image processing device 120 can be operated in the first mode as a basic mode when the camera is activated. The image processing device 120 can be operated in the third mode when the camera is shaken or moved rapidly while the camera is activated.

According to test results for the present inventive concept, when the image processing device 120 operates in the third mode, the interface 140 may process a smaller amount of data per unit of time and may transmit images of a smaller bandwidth. Thus, efficiency in terms of gate count and power consumption may be improved.

In one embodiment, the operation of the image processing device 120 in the second mode may be to operate in the slow motion mode. That is, the image processing device 120 set in the second mode can photograph and store an image, and output the stored image as a slow-motion video. For example, when the image processing device 120 is determined to be in the second mode according to the mode setting signal, the first image signal processor 122 performs the first process on an image photographed, the compressor 124 compresses the photographed image, and the storage unit 130 can store the compressed image input through the storage control unit 125. The image processing device 120 can output the slow motion video through the decompression unit 126 and the second image signal processor 123, after the capturing, the compressing, and the storing the images to be output as the slow motion video are all finished.

Figure 3A:
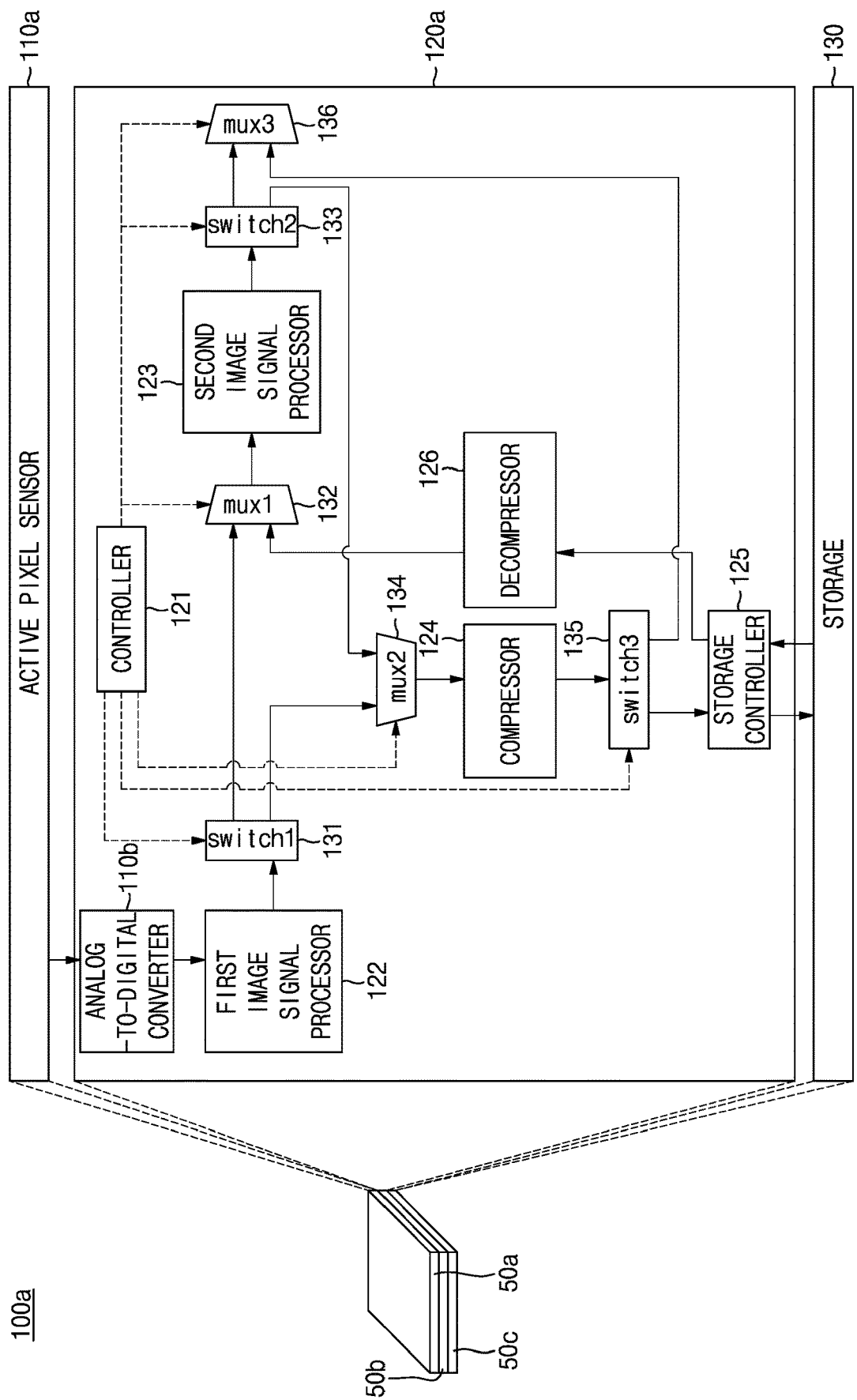
FIGS. 3A and 3B are conceptual views illustrating an example of an image sensor having a stack structure shown in FIG. 1.
Figure 3B:
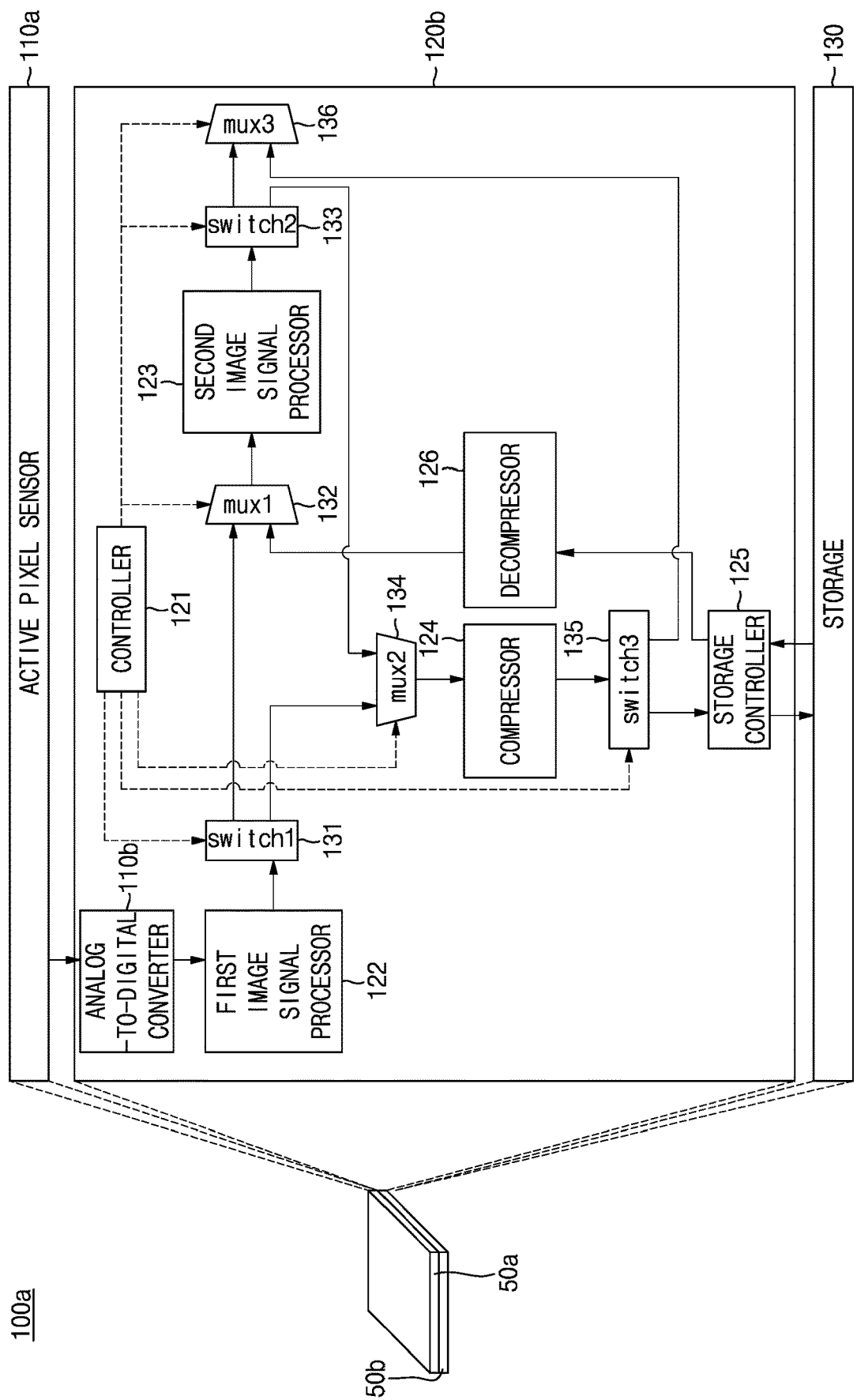

FIGS. 3A and 3B are conceptual views illustrating an example of an image sensor having a stack structure shown in FIG. 1. In FIGS. 3A and 3B, elements the same as those shown in FIG. 2 will be represented by the same reference numerals, and hereinafter, repetitive descriptions concerning the above will be omitted for brevity of description.

Referring to FIG. 3A, an image sensor 100a may include a first chip 50a, a second chip 50b, and a third chip 50c. The first chip 50a of the image sensor 100a may include an active pixel sensor (APS) 110a. The second chip 50b may include an image processing device 120a. The image processing device 120a of the second chip 50b may include the same elements described in FIG. 2. One of the first chip 50a and the second chip 50b may include an analog-to-digital converter 110b connected to the APS 110a. The third chip 50c may include a storage unit 130.

The first to third chips 50a, 50b, and 50c of the image sensor 100a may be sequentially stacked to form a stack structure. The third chip 50c may be located at a lowest layer, and the second chip 50b may be located at a middle layer, and the first chip 50a may be located at an uppermost layer. Alternatively, although not shown in the drawings, the image sensor 100a may include a second chip 50b located at the lowest layer, a third chip 50c located at a middle layer formed on the second chip 50b, and a first chip 50a located at the uppermost layer formed on the third chip 50c.

The image sensor 100a may include a plurality of signal transmission lines configured to transmit pixel signals between the first chip 50a and the second chip 50b. Also, the image sensor 100a may include a plurality of transmission lines configured to transmit pixel signals between the second chip 50b and the third chip 50c.

Also, the image sensor 100a may include non-contact transmission parts configured to transmit pixel signals with a non-contact transmission method. The non-contact transmission parts of the image sensor 100a may be disposed between the first chip 50a and the second chip 50b and between the second chip 50b and the third chip 50c. For example, the non-contact transmission method may include a transmission method of a magnetic combination or a transmission method of an electrostatic combination, but is not limited by the above.

Referring to FIG. 3B, the image sensor 100b may include the first chip 50a of the APS 110a and the second chip 50b of the image processing device 120b. The second chip 50b may include the storage unit 130. When the second chip 50b includes the storage unit 130, the length of the signal transmission lines between the image processing device 120b and the storage unit 130 is decreased, and thus, transmission efficiency may be improved. Also, yield degradation may be reduced during stacking processes.

Figure 4:
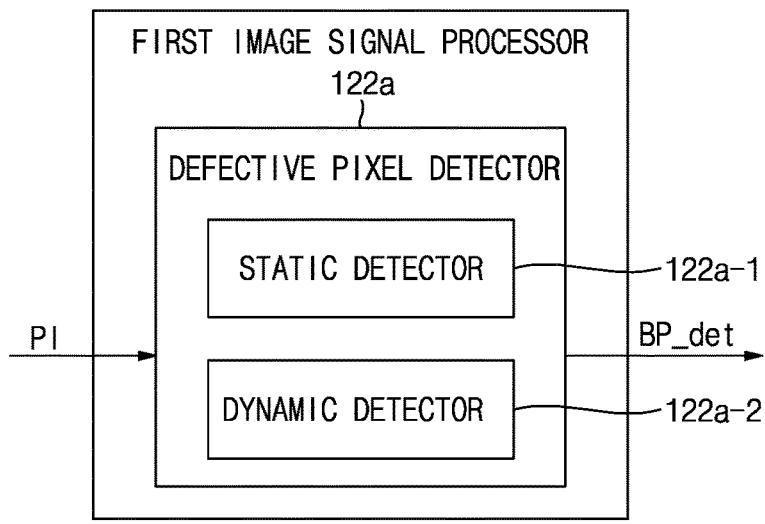
FIG. 4 is a block diagram illustrating an example structure of a first image signal processor shown in FIGS. 2 and 3.

FIG. 4 is a block diagram illustrating a structure of the first image signal processor 122 shown in FIGS. 2, 3A, and 3B.

Referring to FIGS. 2 to 4, the first image signal processor 122 may include a defective pixel detector 122a. The defective pixel detector 122a may detect at least one defective pixel among the pixel image PI input from the image generator 110. For example, the defective pixel detector 122a may sequentially receive a plurality of the pixels of the pixel image PI, and may determine a defective pixel from the plurality of pixels. Thus, the defective pixel may be detected.

When the defective pixel detector 122a detects the defective pixel in the pixel image PI, a defective pixel detection signal BP_det corresponding to the defective pixel may be generated. The defective pixel detection signal BP_det is output to the first switch 131 with the pixel image PI.

For example, the defective pixel detection signal BP_det may be one bit flag which is different from the data of the pixel image PI. Also, the defective pixel detection signal BP_det may include a signal setting a pixel value of the defective pixel as a predetermined value such as zero. The defective pixel detection signal BP_det may replace a pixel having a real pixel value of zero with a pixel having a pixel value of one.

Also, the defective pixel detector 122a may detect a phase detection pixel as well as a defective pixel, and may generate a phase pixel detection signal. The phase detection pixel detection signal may be output to the first switch 131 with the pixel image.

The defective pixel detector 122a may include a static detector 122a-1 and a dynamic detector 122a-2. The APS may include a permanent defective pixel caused by a defect of the image sensor. The static detector 122a-1 may detect a defective pixel of the pixel image corresponding to the permanent defective pixel of the APS. A defective pixel detected by the static detector 122a-1 is referred to as a static defective pixel.

The static detector 122a-1 may receive position information of the permanent defective pixel from a memory. When the location of the pixel in the pixel image received from the image generator 110 is included in the position information of the permanent defective pixel, the pixel is detected as the defective pixel. A permanent defective pixel may be, for example, a pixel that fails to respond to changes in light, and therefore maintains the same output signal regardless of the amount of light that it receives.

The static detector 122a-1 receives the position information of the permanent defective pixel from the memory (not shown), in which the position information of the permanent defective pixel is stored. The static detector 122a-1 detects the defective pixel in the pixel image based on the input position information of the permanent defective pixel. The memory may be an external device connected to the image sensor, or may be an element included in the image sensor. The position information of the permanent defective pixel may include position information of the defective pixel detected during a mass production test and may be stored in the memory. For example, the position information of the permanent defective pixel may include coordinate information of the defective pixels.

The dynamic detector 122a-2 may detect defective pixels randomly generated from the image generator 110 in every pixel image of every frame. For example, a dynamic defective pixel may be generated by degradation of the image sensor due to prolonged use, and the position of the generation may be changed by capturing conditions. The defective pixel detected by the dynamic detector 122a-2 is referred to as a dynamic defective pixel.

The dynamic detector 122a-2 may detect the dynamic defective pixel using a pixel value of any one pixel of the pixel image PI input from the image generator 110 and pixel values of peripheral pixels in a predetermined region around the pixel. According to an example embodiment, when the coordinates of one pixel are $(X_1, Y_1)$, the coordinates of the peripheral pixels may be $(X_1 \mp \alpha, Y_1 \mp \alpha)$, wherein a is a positive integer. For example, the coordinate of the one pixel of the pixel image is (3,3) and a is one, the coordinates of the peripheral pixels may be (2,2), (2,3), (2,4), (3,2), (3,4), (4,2), (4,3), and (4,4). For example, a may be changed based on the size of the pixel data of the pixel image. However, the peripheral pixels are not limited to the above description.

The dynamic detector 122a-2 may set a determination range of the defective pixel using the pixel values of the peripheral pixels. For example, an average luminance value of the peripheral pixels may be calculated, and a predetermined range from the calculation result may be set as a normal pixel range. The dynamic detector 122a-2 may check whether a pixel value of a pixel of the pixel image is included in the normal pixel range determined by the peripheral pixels of the pixel. When the pixel value is not in the normal pixel range, the dynamic detector 122a-2 detects the pixel as the defective pixel.

When the image processing device 120 operates in a second mode or a third mode, the compressor 124 may receive the defective pixel detection signal BP_det and may compress the pixel image based on the defective pixel detection signal BP_det. For example, the compressor 124 may compare pixel values of the remaining pixels excluding the one defective pixel detected from the pixel image, and may compress the pixel image based on the result of the comparison.

The compressor 124 may group the pixels of the pixel image based on a predetermined criterion, and may generate pixel groups. The compressor 124 may compare the pixel values of the pixel group with pixel values of reference pixels, and may compress the pixel image. For example, the reference pixels may be adjacent pixels of the pixel group. Alternatively, the reference pixels may be pixels of a previously compressed pixel group, which is adjacent to the pixel group.

The compressor 124 may generate the pixel groups excluding the defective pixels using the defective pixel detection signal BP_det. Also, the compressor 124 may remove the defective pixels from the reference pixels using the defective pixel detection signal BP_det, and may compare remaining reference pixels with the pixel group. Thus, the pixel image may be compressed based on the comparison result.

Also, when the compressor 124 receives the phase pixel detection signal from the defective pixel detector 122a, the same compression method may be performed as that performed when receiving the defective pixel detection signal BP_det. So in this case, the compressor 124 may remove pixels from which a phase detection signal was received when performing compression.

Figure 5:
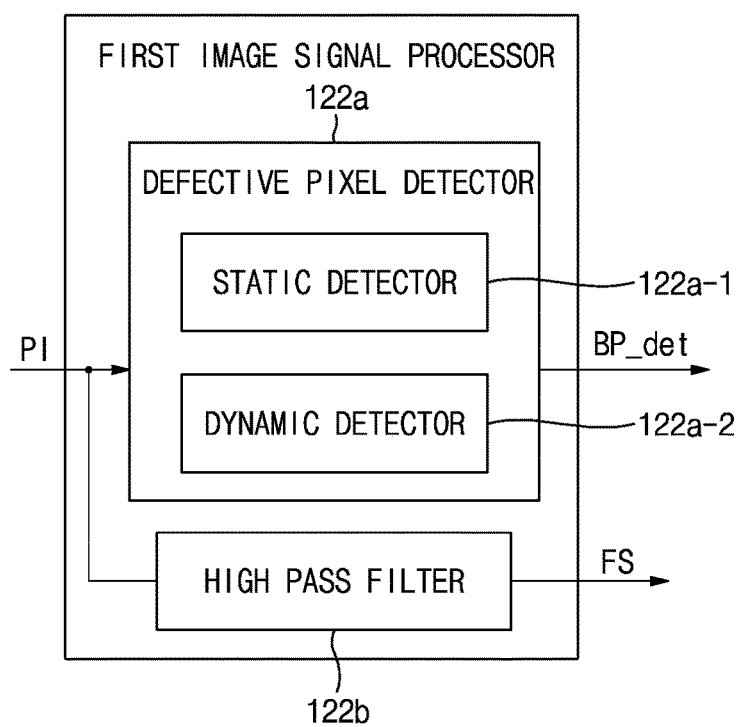
FIG. 5 is a block diagram illustrating an example of the first image signal processor shown in FIG. 4.
Figure 6:
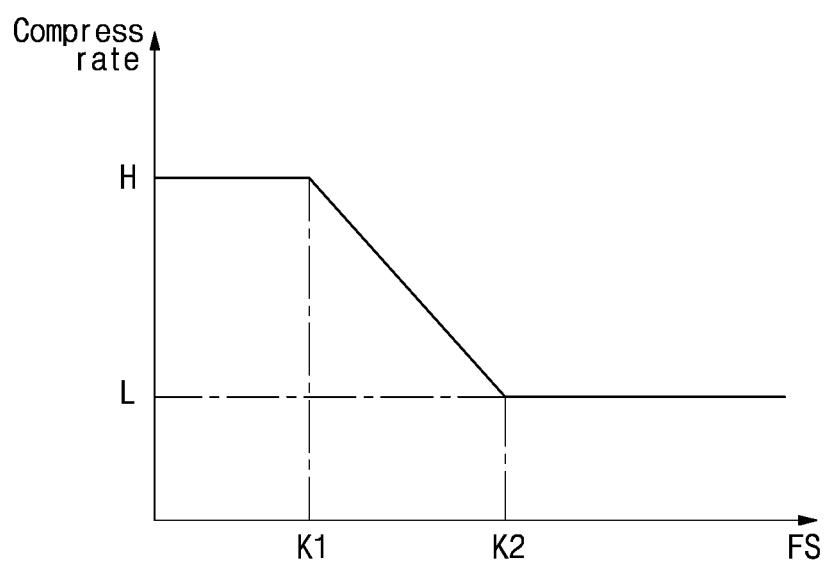
FIG. 6 is a graph for describing an example method of operating a compressor shown in FIG. 5.

FIG. 5 is a block diagram illustrating an example of the first image signal processor shown in FIG. 4. FIG. 6 is a graph for describing a method of operating a compressor shown in FIG. 5. In FIG. 4, elements the same as those shown in FIG. 4 will be represented by the same reference numerals, and hereinafter, repetitive descriptions concerning the above will be omitted for brevity of description.

Referring to FIG. 5, a first image signal processor 122 may further include a high pass filter 122b. stopped The high pass filter 122b may generate a frequency scalar FS corresponding to the pixel image PI. The frequency magnitude value (FS) may be a value corresponding to an image change amount (e.g., a change amount of the brightness of the pixel) between adjacent frames of the pixel image PI. For example, the frequency scalar FS may be determined by the degree of motion of the captured subject. Also, the frequency scalar FS of the pixel image PI may be determined by agitation of the image caused by the motion of the image sensor itself. The high pass filter 122b may generate a frequency scalar of a predetermined region of the pixel image PI. For example, the predetermined region may be a region corresponding to the pixels grouped from the pixel image by the dynamic detector 122a-2. Also, the predetermined region may be a region formed by dividing the pixel image into blocks based on a predetermined reference. The high pass filter 122b may output the frequency scalar with the pixel image to the first switch 131. When the image processing device 120 operates in the second mode or the third mode, the compressor 124 may receive the frequency scalar FS corresponding to the pixel image and may compress the pixel image based on the frequency scalar FS. For example, the compressor 124 may determine the compression ratio of the predetermined region of the pixel image based on the frequency scalar FS corresponding to the predetermined region of the pixel image.

Referring to FIG. 6, when the frequency scalar corresponding to the predetermined region of the pixel image is smaller than or equal to a first reference value K1, the compressor 124 may select a first compression ratio H, which is relatively high, in the predetermined region. When the frequency scalar corresponding to the predetermined region is greater than or equal to a second reference value K2, the compressor 124 may select the second compression ratio L, which is relatively low, in the predetermined region. When the frequency scalar corresponding to the predetermined region is in a range of the first reference value K1 to the second reference value K2, the compressor 124 may select a value in a range of the first compression ratio to the second compression ratio, and may apply the selected value in the predetermined region. For example, when the frequency scalar FS corresponding to the predetermined region is in the range of the first reference value K1 to the second reference value K2, the compression ratio may be linearly decreased between the first compression ratio and the second compression ratio based on the frequency scalar FS, but is not limited thereto. In this manner, a higher frequency scalar FS value (e.g., indicating higher blur) may result in a lower compression ratio between K1 and K2.

For example, when the compressor 124 uses an algorithm configured to encode a difference value between a pixel and a peripheral pixel in a pixel image, pixel value loss may be increased by compressing the pixel image at a compression ratio the same as that of a flat region in the high frequency region. Accordingly, the compressor 124 should decrease the compression ratio in the high frequency region, and pixel value loss in the high frequency region may thus be decreased.

Figure 7:
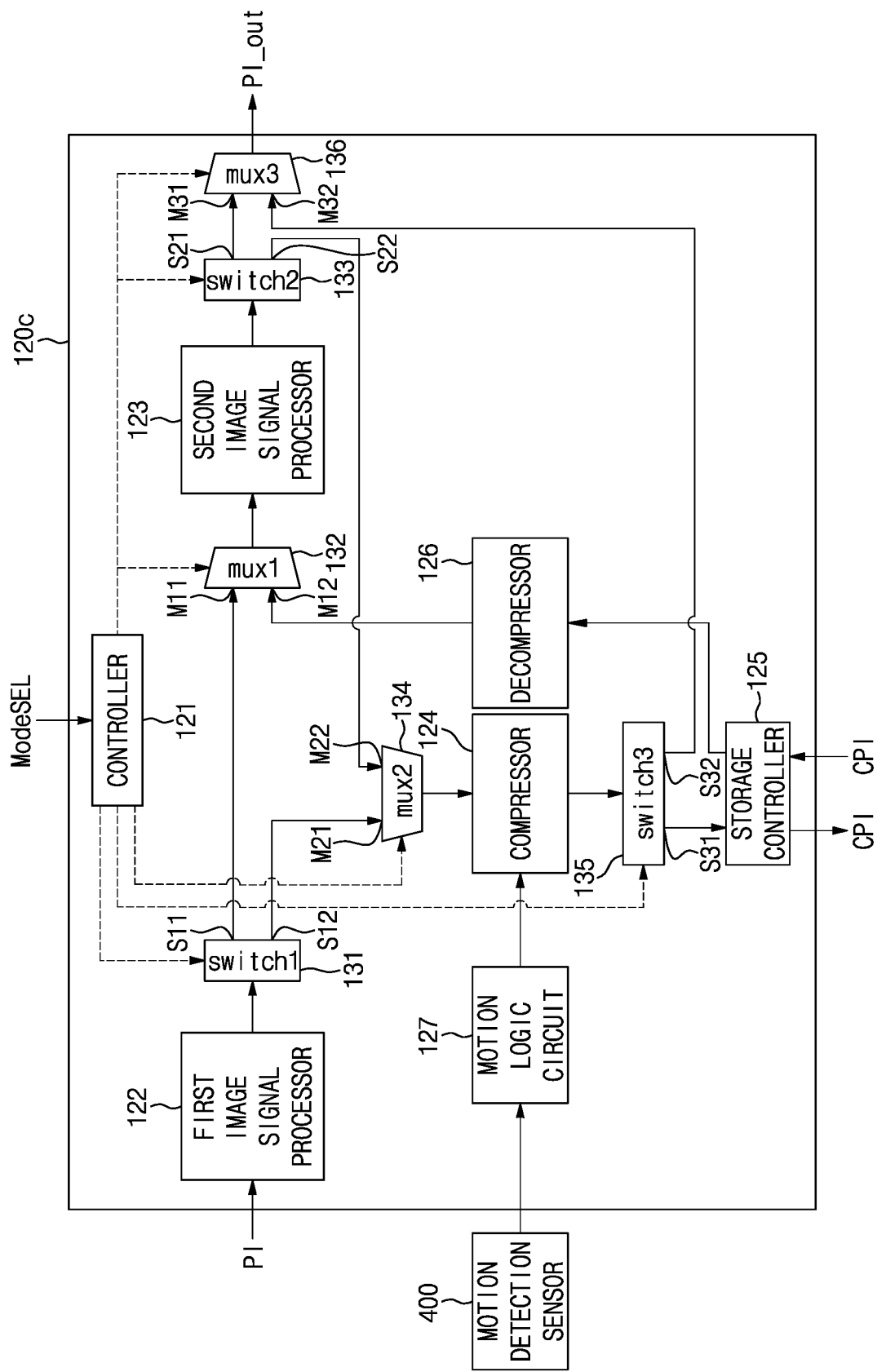
FIG. 7 is a block diagram illustrating a structure of an image processing device according to an example embodiment.
Figure 8:
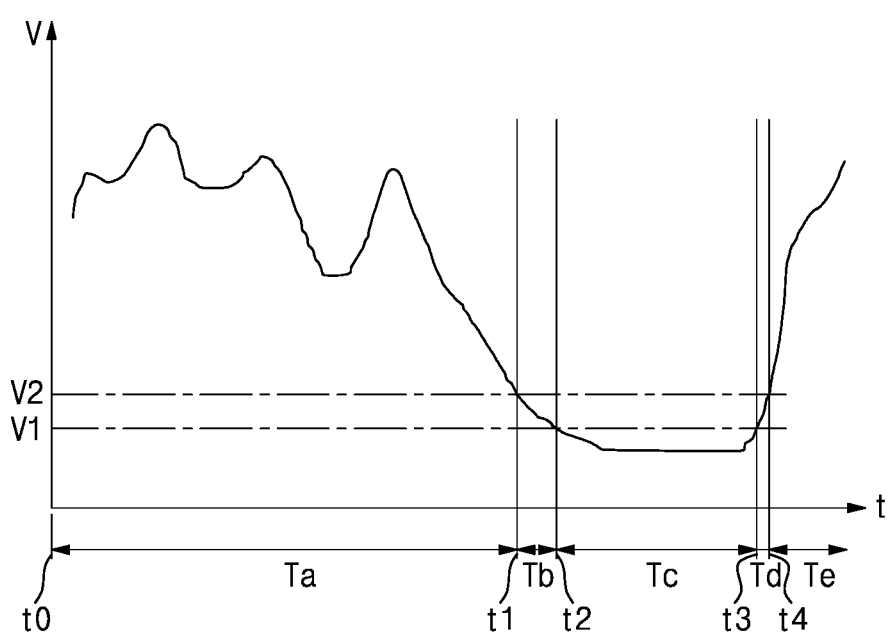
FIG. 8 is a graph for describing an example operation of a motion logic circuit shown in FIG. 7.
Figure 9:
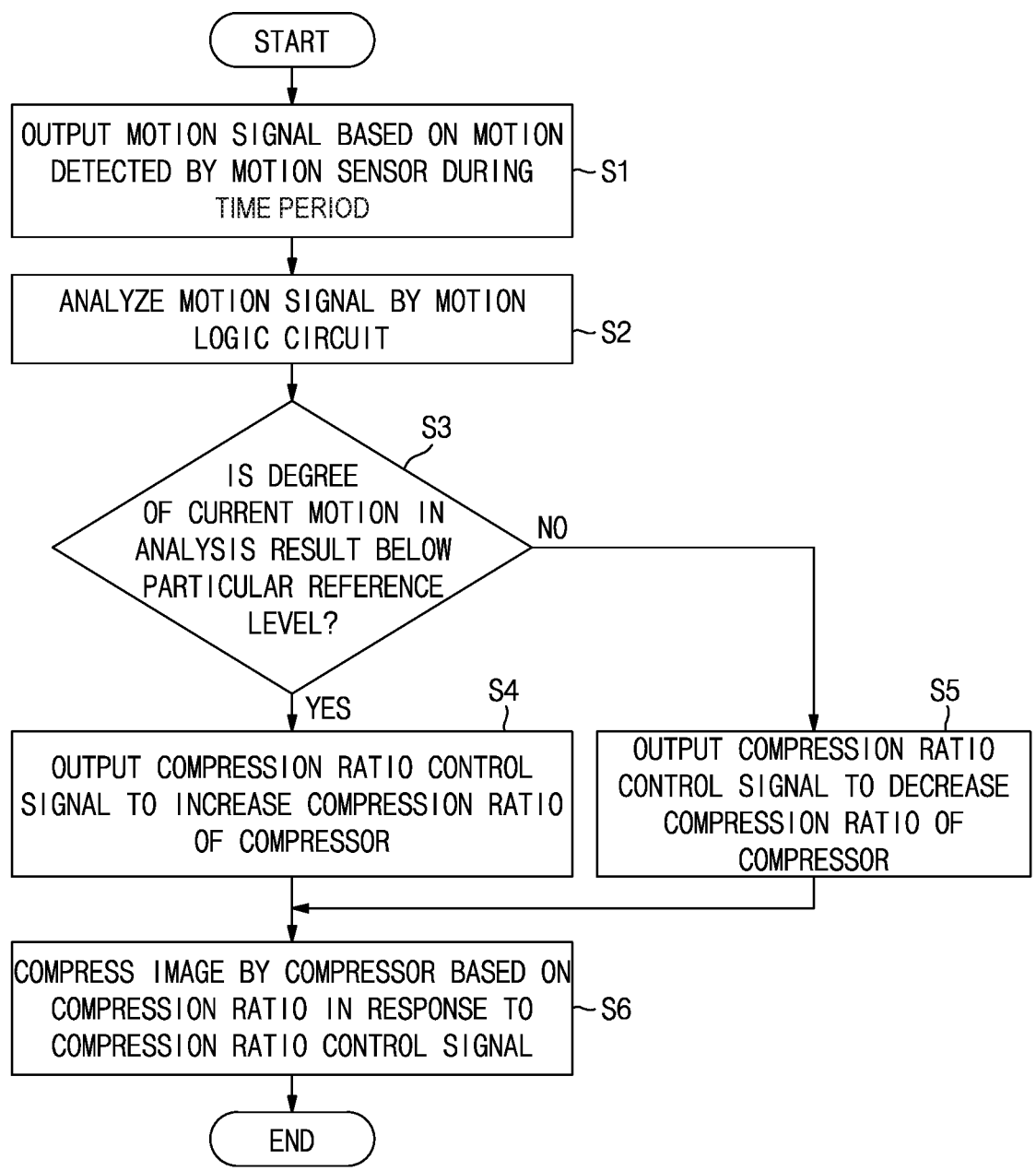
FIG. 9 is a flowchart illustrating an example method of operating the motion logic circuit shown in FIG. 7.

FIG. 7 is a block diagram illustrating a structure of an image processing device according to an example embodiment. FIG. 8 is a graph for describing an operation of a motion logic circuit shown in FIG. 7. FIG. 9 is a flowchart illustrating a method of operating the motion logic circuit shown in FIG. 7. In FIG. 7, elements the same as those shown in FIG. 2 will be represented by the same reference numerals, and hereinafter, repetitive descriptions concerning the above will be omitted for brevity of description.

Referring to FIG. 7, an image processing device 120c includes a motion logic circuit 127. A motion logic circuit 127 may analyze motion of an image sensor to output a compression ratio control signal corresponding to a pixel image to a compressor 124. The compressor 124 may increase or decrease the compression ratio to compress the pixel image in response to a compression ratio control signal input from the motion logic circuit 127.

The motion logic circuit 127 may receive a motion signal of the image sensor from a motion detection sensor 400. The motion detection sensor 400 may sense the motion of the image sensor to generate the motion signal. The motion detection sensor 400 may output the generated motion signal to the motion logic circuit 127. For example, the motion detection sensor 400 may be realized as a chip separate from the image sensor, and may be connected to the image sensor. Also, the motion detection sensor may be included in the image sensor.

The motion logic circuit 127 may analyze the motion signal input from the motion detection sensor 400. When a current motion state and/or a future motion state of the analysis result is greater than or equal to a reference level, the motion logic circuit 127 may generate a compression control signal configured to increase the compression ratio. Also, when the current motion state and/or the future motion state of the analysis result is smaller than or equal to a reference level, the motion logic circuit 127 may generate a compression control signal configured to decrease the compression ratio. The term "greater than or equal to a reference level" may indicate a state in which an image generated and processed in an image sensor is not actually used. For example, the term "greater than or equal to the reference level" may indicate a state in which a camera is activated but before capturing a moving image or picture begins. For example, the reference level may indicate such a large degree of motion (e.g., immediately after a user turns on a camera or selects a mode, or after a user has finished an intended video but the camera is still on and may be moving a lot) that the pixel image can have a large compression ratio since the image at that particular time is unlikely to be used.

The term "smaller than or equal to the reference level" may indicate a state in which the image generated and processed in an image sensor is used. For example, the term "smaller than or equal to the reference level" represents a state in which a camera is capturing a moving image or a picture.

According to an example embodiment, when the moving image is currently being captured, the motion logic circuit 127 may not generate the compression control signal, regardless of the analysis result of the motion.

Referring to FIGS. 8 and 9, the graph of FIG. 8 depicts a value of an input motion signal (Y-axis, labeled "V") that corresponds to an amount of motion, and time (X-axis, labeled "t"). When the input motion signal is greater than or equal to a second reference level V2 (in a range of Ta from time $t_0$ to time $t_1$), the motion logic circuit 127 may determine that a current motion state of the image sensor is a state in which an image generated and processed in the image sensor is not actually used. The motion logic circuit 127 may generate a compression control signal configured to increase the compression ratio.

When the input motion signal is smaller than a first reference level V1 (in a range of Tc from time $t_2$ to time $t_3$), the motion logic circuit 127 may determine that the current motion state of the image sensor is a state in which the image generated and processed by the image sensor is actually used. The motion logic circuit 127 may generate a compression control signal configured to decrease the compression ratio.

When the input motion signal is again greater than the second reference level V2 (in a range of Te after time $t_4$), the motion logic circuit 127 may determine that the current motion state of the image sensor is a state in which the image generated and processed in the image sensor is not actually used. The motion logic circuit 127 may generate a compression control signal configured to increase the compression ratio.

When the input motion signal is smaller than the second reference level V2 and greater than the first reference level V1 (in a range Tb from time $t_1$ to time $t_2$), due to a low rate of change of motion, the motion logic circuit 127 may determine that the current motion state of the image sensor is a state in which the image generated and processed in the image sensor is actually used. The motion logic circuit 127 may generate a compression control signal configured to decrease the compression ratio.

When the input motion signal is greater than the first reference level V1 and smaller than the second reference level V2 (in a range Td from time $t_3$ to time $t_4$), due to the high rate of change in the motion, the motion logic circuit 127 may determine that the current motion state of the image sensor is a state in which the image generated and processed in the image sensor is not actually used. The motion logic circuit 127 may generate a compression control signal configured to increase the compression ratio.

FIG. 9 depicts a flow chart consistent with the graph shown in FIG. 8 and the diagram shown in FIG. 7. For example, in step S1, a motion signal is output based on motion detected by the motion detection sensor 400 during a predetermined time period (e.g., any one of the time periods Ta through Te). In step S2, the motion signal is analyzed by a motion logic circuit 127. In step S3, based on the analysis, it is determined whether the degree of the current motion results in a value above a particular reference level (e.g., V1). If not (e.g., step S3, NO), then a compression ratio control signal is output to decrease the compression ratio of the compressor (step S5). If so (e.g., step S3, YES), then a compression ration control signal is output to increase the compression ratio of the compressor (step S4). In step S6, the image is compresses by a compressor based on the compression ratio in response to the compression ratio control signal.

Figure 10:
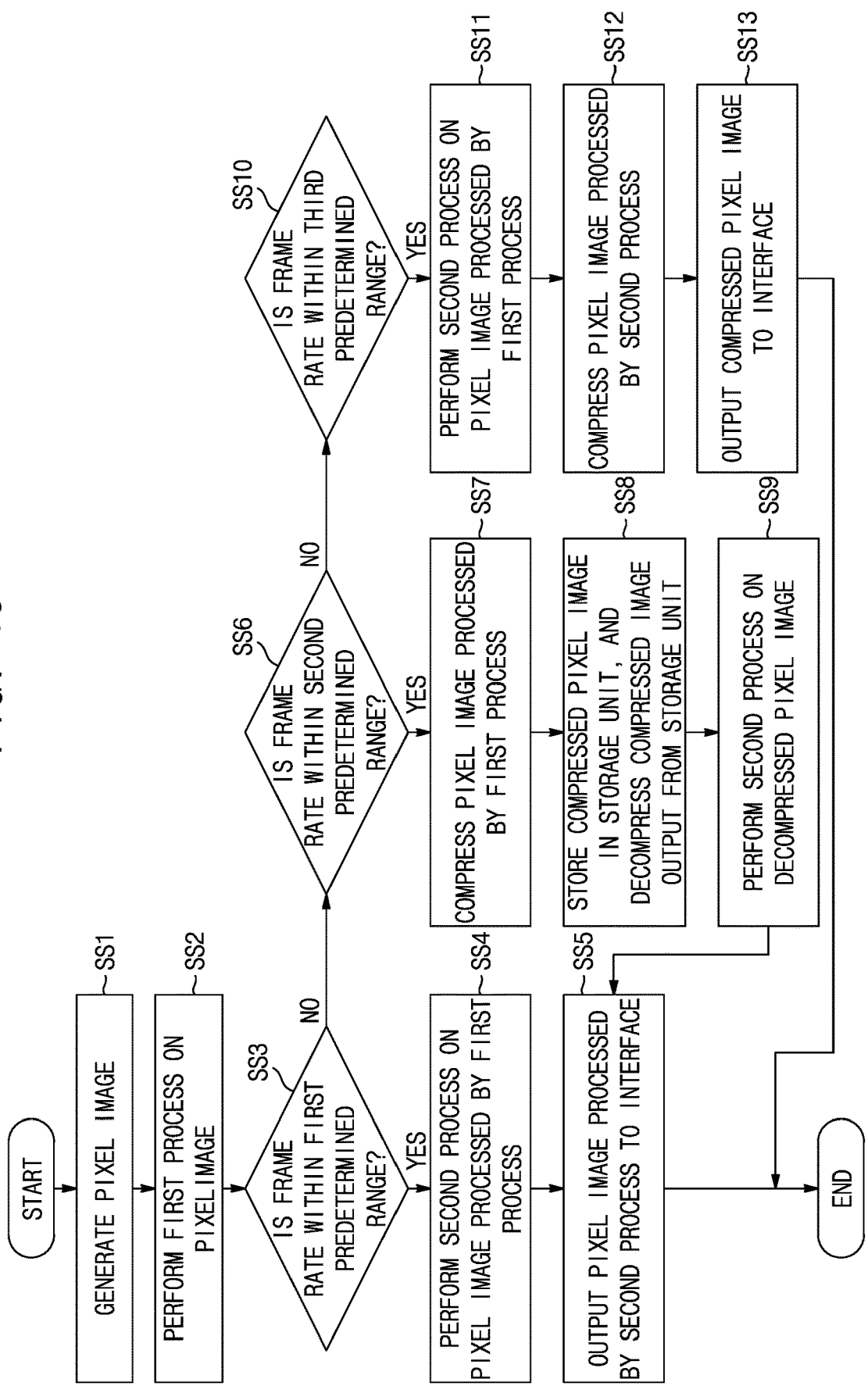
FIG. 10 is a flowchart illustrating a method of controlling an image processing device according to an example embodiment.

FIG. 10 is a flowchart illustrating a method of controlling an image processing device 120 according to an example embodiment.

Referring to FIGS. 2 and 10, the image processing device 120 according to the example embodiment may determine a mode based on a frame rate of a pixel image PI, which is input to the image processing device 120 through an image generator 11.

In one embodiment, the image processing device 120 can operate in the first mode when the frame rate of the input pixel image PI is included in a relatively low first predetermined range. The image processing device 120 can operate in the second mode when the frame rate of the input pixel image PI is included in the second predetermined range higher than the first predetermined range. The image processing device 120 can operate in the third mode when the frame rate of the input pixel image PI is included in the third predetermined range that is between the first predetermined range and the second predetermined range. That is, the minimum value of the third predetermined range may be relatively larger than the maximum value of the first predetermined range, and the maximum value of the third predetermined range may be relatively smaller than the minimum value of the second predetermined range. However, the relationship of the first to third predetermined ranges is not limited to the above. The first to third predetermined ranges may be predetermined by the user, may be different ranges, or may be ranges in which some of them overlap each other.

In step SS1, a pixel image is generated, for example, by a an active pixel sensor. Then, in step SS2, a first process is performed on the pixel image, as discussed above in connection with first signal processor 122. Next, in step SS3, YES, when the frame rate of the input pixel image is within a first predetermined range (e.g., below a predetermined value), the image processing device 120 may determine a mode as a first mode. For example, this mode may correspond to a slower frame rate that is for regular speed and not slow motion video. When the image processing device 120 is in the first mode, a controller 121 may generate a first path selection signal, and may output the first path selection signal to a first switch 131, a first multiplexer 132, a second switch 133, and a third multiplexer 136. In the first mode of the image processing device 120, a first image processor may perform a first process on the pixel image (step SS2), and a second image signal processor 123 may perform a second process on the pixel image processed by the first process (step SS4). The pixel image processed by the second process is then output to interface 140 (step SS5).

When the frame rate of the input pixel image is within a second predetermined range, the image processing device 120 may determine a mode as a second mode (step SS6, YES). For example, this mode may correspond to a frame rate faster than the first mode. When the image processing device 120 is in the second mode, the controller 121 may generate a second path selection signal, and may output the second path selection signal to the first to third switches 131, 133, and 135, and the first to third multiplexers 132, 134, and 136. In the second mode of the image processing device 120, the first image signal processor 122 may perform a first process on the pixel image (step SS2), a compressor 124 may compress the pixel image processed by the first process (step SS7), and the compressed pixel image may be stored in a storage unit (step SS8). Also, a decompressor 126 may decompress the compressed pixel image output from the storage unit 130 (step SS8), and the second image signal processor 123 may perform a second process on the decompressed pixel image (step SS9). The pixel image processed by the second process is then output to interface 140 (step SS5).

When the frame rate of the input pixel image is within a third predetermined range, the image processing device 120 may determine the mode as a third mode (step SS10, YES). For example, this mode may correspond to a frame rate faster than the first mode. In the third mode of the image processing device 120, the controller 121 may generate a third path selection signal, and may output the third path selection signal to the first to third switches 131, 133, and 135 and the first to third multiplexers 132, 134, and 136. In the third mode of the image processing device 120, the first image signal processor 122 may perform a first process on the pixel image (step SS2), and the second image signal processor 123 may perform a second process on the pixel image processed by the first process (step SS11). Also, the compressor 124 may compress the pixel image processed by the second process (step SS12), and the third multiplexer 136 may output the compressed pixel image (step SS13), for example, to an interface such as interface 140.

According to one example embodiment, the mode of the image processing device 120 may be determined based on a state of a power condition. When power of the image processing device 120 is smaller than or equal to a predetermined reference value (e.g., a remaining battery power of an electronic device that includes the image processing device 120 is below a certain level), the image processing device 120 may operate in a preset mode regardless of the frame rate of the pixel image to decrease power consumption. For example, the preset mode may be the first mode in which the pixel image is not compressed. According to an example embodiment, since an image is compressed based on defective pixel data detected from the image, an image sensor configured to decrease image loss can be realized.

According to an example embodiment, a compression ratio corresponding to a high frequency region of an image is decreased, and the image is compressed. Thus, an image sensor capable of decreasing image loss can be realized.

According to an example embodiment, a motion signal of an image sensor is analyzed, and an compression ratio used for an image is decreased based on the analysis. Thus, the image is compressed, and an image sensor capable of decreasing image loss can be realized.

While the example embodiments have been described with reference to the accompanying drawings, it should be understood by those skilled in the art that various modifications may be made without departing from the scope of the example embodiments and without changing essential features thereof. Therefore, the above-described embodiments should be considered in a descriptive sense only and not for purposes of limitation.

What is claimed is:

1. An image sensor comprising:
a first chip including an image generator configured to generate and output a pixel image;
a second chip including an image processing device configured to determine one mode among a plurality of modes based on an externally applied mode setting signal, generate a plurality of path selection signals based on the determined mode, and process the pixel image in response to the path selection signals; and
a third chip including a storage unit in which the pixel image output from the image processing device is stored,
wherein the second chip includes at least a first image signal processor, a compressor, and a decompressor,
wherein the second chip is stacked on the third chip and the first chip is stacked on the second chip so that the second chip is between the first chip and the third chip, or the third chip is stacked on the second chip and the first chip is stacked on the third chip so that the third chip is between the first chip and the second chip, and
wherein the image sensor is configured such that:
when the mode setting signal indicates a first mode, a first plurality of path selection signals based on the first mode are generated, which cause a pixel image processed by at least the first image signal processor to be output by the image processing device without passing through the compressor,
when the mode setting signal indicates a second mode, a second plurality of path selection signals based on the second mode are generated, which cause a pixel image processed by at least the first image signal processor to be output by the image processing device after passing through the compressor, to be stored in the storage unit, and after being stored in the storage unit, to pass through the decompressor before being output by the image processing device for display, and
when the mode setting signal indicates a third mode, a third plurality of path selection signals based on the third mode are generated, which cause a pixel image processed by at least the first image signal processor to be output from the image processing device for display after passing through the compressor and without passing through the decompressor.

2. The image sensor of claim 1, wherein the image sensor is further configured such that:
when the mode setting signal indicates the second mode, the second plurality of path selection signals further cause the pixel image to be stored in the storage unit after passing through the compressor.

3. An image sensor comprising:
a first chip including an image generator configured to generate and output a pixel image;
a second chip including an image processing device configured to determine one mode among a plurality of modes based on an externally applied mode setting signal, generate a plurality of path selection signals based on the determined mode, and process the pixel image in response to the path selection signals; and
a third chip including a storage unit in which the pixel image output from the image processing device is stored,
wherein the second chip is stacked on the third chip and the first chip is stacked on the second chip so that the second chip is between the first chip and the third chip, or the third chip is stacked on the second chip and the first chip is stacked on the third chip so that the third chip is between the first chip and the second chip, and
wherein the image processing device comprises:
a first image signal processor configured to perform a first process on the pixel image output from the image generator;
a first switch connected to an output terminal of the first image signal processor, and configured to output through one of a first output terminal and a second output terminal the pixel image processed by the first process, in response to the plurality of path selection signals;
a compressor configured to compress the pixel image processed by the first process and output the compressed pixel image;
a storage controller configured to output the compressed pixel image output from the compressor to the storage unit, receive the compressed pixel image output from the storage unit, and output the compressed pixel image output from the storage unit;
a decompressor configured to decompress the compressed pixel image output from the storage controller;
a first multiplexer including a first input terminal connected to the first output terminal of the first switch and a second input terminal connected to an output terminal of the decompressor, the first multiplexer outputting one of the pixel image processed by the first process and received through the first input terminal and the decompressed pixel image received through the second input terminal in response to the plurality of path selection signals;
a second image signal processor configured to perform a second process on one of the pixel image processed by the first process and the decompressed pixel image output through the first multiplexer; and
a controller configured to generate the plurality of path selection signals corresponding to the determined mode and output respective path selection signals of the plurality of generated path selection signals to the first switch and the first multiplexer.

4. The image sensor of claim 3, wherein:
the first image signal processor comprises a high pass filter configured to generate a frequency scalar of a predetermined region of the pixel image; and
the compressor controls a compression ratio corresponding to the predetermined region based on the frequency scalar output from the high pass filter.

5. The image sensor of claim 3, wherein:
the first image signal processor comprises a defective pixel detector configured to detect a defective pixel in the pixel image to generate a defective pixel detection signal; and
the compressor compresses the pixel image based on the defective pixel detection signal output from the defective pixel detector.

6. The image sensor of claim 3, wherein:
when the determined mode is a first mode,
the controller generates a first set of path selection signals; and
the first switch outputs the pixel image processed by the first process through the first output terminal, and the first multiplexer outputs the pixel image processed by the first process received through the first input terminal to the second image signal processor, in response to the first set of path selection signals.

7. The image sensor of claim 3, wherein:
when the determined mode is a second mode,
the controller generates a second set of path selection signals; and
the first switch outputs the pixel image processed by the first process through the second output terminal to the compressor, and the first multiplexer outputs the decompressed pixel image to the second image signal processor, in response to the second set of path selection signals.

8. The image sensor of claim 3, wherein the image processing device comprises:
a second switch connected to an output terminal of the second image signal processor, and configured to output through one of a third output terminal and a fourth output terminal the pixel image processed by the second process, in response to the plurality of path selection signals;
a second multiplexer including a third input terminal connected to the second output terminal of the first switch and a fourth input terminal connected to the fourth output terminal of the second switch, the second multiplexer outputting one of the pixel image processed by the first process and the pixel image processed by the second process to the compressor, in response to the plurality of path selection signals;
a third switch connected to an output terminal of the compressor, the third switch outputting the compressed pixel image through one of a fifth output terminal and a sixth output terminal, in response to the plurality of path selection signals; and
a third multiplexer including a fifth input terminal connected to the third output terminal of the second switch and a sixth input terminal connected to the sixth output terminal of the third switch, the third multiplexer outputting the pixel image processed by the second process and received through the fifth input terminal or the compressed pixel image received through the sixth input terminal, in response to the plurality of path selection signals.

9. The image sensor of claim 8, wherein:
when the determined mode is a third mode,
the controller generates a third set of path selection signals and outputs the generated third set of path selection signals to the first to third switches and the first to third multiplexers; and
the first switch outputs the pixel image processed by the first process through the first output terminal, the first multiplexer outputs the pixel image processed by the first process to the second image signal processor, the second switch outputs the pixel image processed by the second process through the fourth output terminal, the second multiplexer outputs the pixel image processed by the second process to the compressor, the third switch outputs the compressed pixel image through the sixth output terminal, and the third multiplexer outputs the compressed pixel image, in response to the third set of path selection signals.

10. An electronic device comprising:
an image sensor including an image generator configured to generate and output a pixel image, an image processing device configured to process the pixel image, and a storage unit configured to store the pixel image; and
an application processor configured to generate a mode setting signal, and configured to transmit the generated mode setting signal to the image processing device,
wherein the image processing device includes at least a first image signal processor, a compressor, and a decompressor,
wherein the image processing device is configured to generate a plurality of path selection signals for selecting a path to use by the image processing device to process the pixel image, based on the mode setting signal,
wherein the image processing device is configured such that:
when the mode setting signal indicates a first mode, a first plurality of path selection signals based on the first mode are generated, which cause a pixel image processed by at least the first image signal processor to be output by the image processing device without passing through the compressor, and
when the mode setting signal indicates a second mode, a second plurality of path selection signals based on the second mode are generated, which cause a pixel image processed by at least the first image signal processor to be output by the image processing device after passing through the compressor and without passing through the decompressor,
wherein the image processing device selects a compression ratio for the pixel image based on at least one of an input signal of a user, an analysis result of the pixel image, and a motion signal of the image sensor that indicates motion of the image sensor, and
wherein the compressor compresses the pixel image based on the selected compression ratio.

11. The electronic device of claim 10, wherein:
the image sensor comprises a first chip including the image generator, and a second chip including the image processing device and the storage unit; and
the first chip is stacked on the second chip.

12. The electronic device of claim 10, wherein:
the image sensor comprises a first chip including the image generator, a second chip including the image processing device, and a third chip including the storage unit; and
the second chip is stacked on the third chip and the first chip is stacked on the second chip so that the second chip is between the first chip and the third chip, or the third chip is stacked on the second chip and the first chip is stacked on the third chip so that the third chip is between the first chip and the second chip.

13. The electronic device of claim 10, wherein:
the first image signal processor comprises a high pass filter configured to generate a frequency scalar of a predetermined region of the pixel image; and
the compressor controls a compression ratio corresponding to the predetermined region based on the frequency scalar output from the high pass filter.

14. An electronic device comprising:
an image sensor including an image generator configured to generate and output a pixel image, an image processing device configured to process the pixel image, and a storage unit configured to store the pixel image; and
an application processor configured to generate a mode setting signal, and configured to transmit the generated mode setting signal to the image processing device,
wherein the image processing device is configured to generate a plurality of path selection signals for selecting a path to use by the image processing device to process the pixel image, based on the mode setting signal, and
wherein the image processing device selects a compression ratio for the pixel image based on at least one of an input signal of a user, an analysis result of the pixel image, and a motion signal of the image sensor that indicates motion of the image sensor, and compresses the pixel image based on the selected compression ratio, wherein the image processing device comprises:
a first image signal processor configured to perform a first process on the pixel image output from the image generator;
a first switch connected to an output terminal of the first image signal processor, the first switch outputting through a first output terminal or a second output terminal the pixel image processed by the first process, in response to the plurality of path selection signals;
a compressor configured to compress the pixel image processed by the first process and output a compressed pixel image;
a storage controller configured to output the compressed pixel image output from the compressor to the storage unit and receive the compressed pixel image output from the storage unit, and output the compressed pixel image output from the storage unit;
a decompressor configured to decompress the compressed pixel image output from the storage controller;
a first multiplexer including a first input terminal connected to the first output terminal of the first switch and a second input terminal connected to an output terminal of the decompressor, the first multiplexer outputting the pixel image processed by the first process and received through the first input terminal or the decompressed pixel image received through the second input terminal, in response to the plurality of path selection signals;
a second image signal processor configured to perform a second process on the pixel image processed by the first process or the decompressed pixel image output through the first multiplexer; and
a controller configured to generate the plurality of path selection signals corresponding to a mode indicated in the mode setting signal and configured to output the generated path selection signals to the first switch and the first multiplexer.

15. The electronic device of claim 14, wherein:
when the mode is a first mode,
the controller generates a first set of path selection signals; and
the first switch outputs the pixel image processed by the first process through the first output terminal, and the first multiplexer outputs the pixel image processed by the first process received through the first input terminal to the second image signal processor, in response to the first set of path selection signals.

16. The electronic device of claim 14, wherein:
when the mode is a second mode,
the controller generates a second set of path selection signals; and
the first switch outputs the pixel image processed by the first process through the second output terminal to the compressor, and the first multiplexer outputs the decompressed pixel image to the second image signal processor, in response to the second set of path selection signals.

17. The electronic device of claim 14, wherein the image processing device comprises:
a second switch connected to an output terminal of the second image signal processor, and configured to output the pixel image processed by the second process through one of a third output terminal and a fourth output terminal, in response to the plurality of path selection signals;
a second multiplexer including a third input terminal connected to the second output terminal of the first switch and a fourth input terminal connected to the fourth output terminal of the second switch, the second multiplexer outputting one of the pixel image processed by the first process and the pixel image processed by the second process to the compressor, in response to the plurality of path selection signals;
a third switch connected to an output terminal of the compressor, the third switch outputting the compressed pixel image through one of a fifth output terminal and a sixth output terminal, in response to the plurality of path selection signals; and
a third multiplexer including a fifth input terminal connected to the third output terminal of the second switch and a sixth input terminal connected to the sixth output terminal of the third switch, the third multiplexer outputting the pixel image processed by the second process and received through the fifth input terminal or the compressed pixel image received through the sixth input terminal, in response to the plurality of path selection signals.

18. The electronic device of claim 17, wherein:
when the mode is a third mode,
the controller generates a third set of path selection signals and outputs the generated third set of path selection signals to the first to third switches and the first to third multiplexers; and
the first switch outputs the pixel image processed by the first process through the first output terminal, the first multiplexer outputs the pixel image processed by the first process to the second image signal processor, the second switch outputs the pixel image processed by the second process through the fourth output terminal, the second multiplexer outputs the pixel image processed by the second process to the compressor, the third switch outputs the compressed pixel image through the sixth output terminal, and the third multiplexer outputs the compressed pixel image, in response to the third set of path selection signals.

19. An image sensor comprising:
a first chip including an image generator configured to generate and output a pixel image;
a second chip including an image processing device configured to determine one mode among a plurality of modes based on an externally applied mode setting signal, generate a plurality of path selection signals based on the determined mode, and process the pixel image in response to the path selection signals; and
a third chip including a storage unit in which the pixel image output from the image processing device is stored,
wherein the second chip includes at least a first image signal processor, a compressor, and a decompressor,
wherein the second chip is stacked on the third chip and the first chip is stacked on the second chip so that the second chip is between the first chip and the third chip, or the third chip is stacked on the second chip and the first chip is stacked on the third chip so that the third chip is between the first chip and the second chip, and
wherein the image sensor is configured such that:
when the mode setting signal indicates a first mode, a first plurality of path selection signals based on the first mode are generated, which cause a pixel image processed by at least the first image signal processor to be output by the image processing device after passing through the compressor, to be subsequently stored in a storage unit, and then to pass through a decompressor, and
when the mode setting signal indicates a second mode, a second plurality of path selection signals based on the second mode are generated, which cause a pixel image processed by at least the first image signal processor to be output by the image processing device after passing through the compressor, subsequently passing through a second image processor of the image processing device, and without passing through the decompressor.

* * * * *